United States Patent [19]

Ito

[11] Patent Number: 4,915,117
[45] Date of Patent: Apr. 10, 1990

[54] CIGARETTE

[76] Inventor: Midori Ito, 16-go, 1-ban, Kyomachi 1-chome, Takefu-shi, Fukui-ken, Japan

[21] Appl. No.: 228,616

[22] Filed: Aug. 5, 1988

[30] Foreign Application Priority Data

Aug. 5, 1987 [JP] Japan .................................. 62-195490

[51] Int. Cl.⁴ .............................................. A24D 1/02
[52] U.S. Cl. ...................................... 131/365; 131/349
[58] Field of Search ........................ 131/360, 365, 349; 162/139

[56] References Cited

U.S. PATENT DOCUMENTS

| 2,137,706 | 11/1938 | Ubben | 131/365 |
| 2,327,991 | 8/1943 | Betts | 131/349 |
| 4,433,697 | 2/1984 | Cline et al. | 131/365 |
| 4,480,650 | 11/1984 | Weinert | 131/365 |

Primary Examiner—Vincent A. Millin
Assistant Examiner—J. Welsh
Attorney, Agent, or Firm—Edwin E. Greigg

[57] ABSTRACT

A cigarette comprising a thin sheet for holding tobacco. The thin sheet is formed of a ceramic sheet by thermal decomposition of a woven or nonwoven fabric of ceramic fiber at a high temperature which produces no harmful organic substance with heat occurring with smoking of the cigarette.

13 Claims, 1 Drawing Sheet

CIGARETTE

BACKGROUND OF THE INVENTION (1) Field of the Invention

The present invention relates to cigarettes which produce minimal amounts of tar and other harmful organic substances with the heat occurring with smoking, thereby to minimize the harmful effect of smoking on health.

(2) Description of the Prior Art

Cigarettes comprising tobacco rolled in paper (rice paper) are manufactured and distributed in great quantities since they are handy to smoke anywhere without necessitating pipes or other instruments.

However, cigarettes are more harmful than cigars and pipe tobacco, and tend to cause troubles of circulatory organs such as the heart and blood vessels, and diseases such as bronchitis, stomach ulcer, hepatocirrhosis and so on. Cigarette smoking is said to have a high probability of leading to lung cancer in particular. The reason is believed to lie in that cigarettes have a relatively high burning temperature (800° C.) compared with other types of tobacco, which tends to produce tar and other cancerating substances.

The cigarette includes tobacco and paper (rice paper). The paper is formed by combining fibrous base materials such as staple fiber, flax and hemp with various combustion improvers.

If the cigarette is disintegrated into tobacco and paper which are then lit separately, they burn gradually with the paper giving a royal purple smoke having a peculiar irritating smell and tobacco giving a white smoke.

Upon comparison, the smoke from the paper has a far more irritating smell and a far greater irritating effect on mucosae of the nose and eyes than the smoke from tobacco.

When a glass rod at the temperature of 25° C. is exposed to each of these smokes, tar adheres to the glass rod. The color of tar is darker when the glass rod is exposed to the smoke from the paper than when it is exposed to the smoke from the tobacco. Furthermore, this tar contains large amounts of cancerating substances such as benzopyrene and benzantrasen.

Incidentally, there are two types of tobacco smoke. One is a white smoke (or a primary smoke) flowing through the cigarette itself into the smoker's mouth, and the other is a purple smoke (or a secondary smoke) rising from a burning position.

The secondary smoke contains far greater amounts of harmful substances than the primary smoke. Since this smoke is alkaline, it greatly irritates mucosea. The World Health Organization has warned in recent years that non-smokers staying near smokers are risking their health by inhaling the harmful secondary smoke into their lungs, thereby to develop troubles of the respiratory organs, lung cancer, and other diseases.

As a result, the "Non-Smoker's Rights" have been claimed throughout the world.

Cigarettes have been proposed recently, in Japanese Utility Model Application Kokai No. 56-129294, which are rolled in incombustible sheets of paper formed by mixing a paper material with pumice powder and asbestos powder.

These cigarettes are intended for preventing fires caused by smoking in bed, careless handling of cigarette ends remaining alight, and throwing away cigarette ends. This proposal is not made with a view to reducing the hazard to health due to the harmful organic substances produced by the burning paper of cigarettes. The proposal has the following problem also.

Since the incombustible sheet comprises a paper base material over which asbestos powder and the like are distributed, tar and other harmful organic substances are produced when the cigarettes are smoked or left alight with the paper subjected to incomplete combustion. These harmful substances fill a room or inhaled through the mouth, thereby giving rise to the same problem as in the case of other known cigarettes.

Furthermore, the asbestos powder used in the incombustible sheet may cause pseumoconiosis to the detriment of health.

SUMMARY OF THE INVENTION

The inventor has made intensive researches for solving the above problem. These researches have arrived at the findings that cigarettes are more harmful than cigars and pipe tobacco.

The present invention has been made on the fact that, when the paper material used in cigarettes is decomposed, harmful organic substances, mainly tar, irritate mucosea of the eye upon contact, for example, and give an unpleasant smell to people around the smoker.

Thus, the invention provides a cigarette comprising a thin sheet for holding tobacco, wherein the thin sheet is formed of a ceramic sheet which produces no harmful organic.substance with heat occurring with smoking of the cigarette.

According to this invention, tobacco is rolled in a ceramic sheet which does not produce harmful organic substances with the heat of smoking. This cigarette, therefore, produces only a small amount of tar when smoked, which is effective to minimize the unpleasant feeling and irritating smell given to people around the smoker.

Unlike the conventional cigarettes, the cigarette having the above construction according to this invention involves no harmful organic substance produced from paper. This cigarette is relatively safe for the smoker, and gives the unpleasant feeling to people around the smoker to a less degree. Thus, the cigarette according to the invention has the advantage of minimizing the harmful effect on health.

Other advantages of the present invention will be apparent from the following description to be had with reference to the drawings.

BRIEF DESCRIPTION OF THE DRAWINGS

The drawings show a cigarette embodying the present invention, in which.

DETAILED DESCRIPTION OF THE PREFERRED EMBODIMENTS

Figure 1:
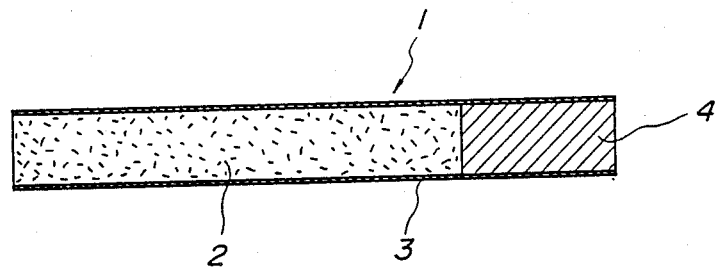
FIG. 1 is a perspective view of the cigarette.
Figure 2:
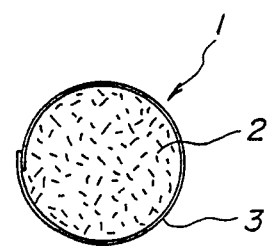
FIG. 2 is a cross section of the cigarette.

Embodiments of the pressent invention will be described in detail hereinafter, but the invention is not limited to these embodiments.

The drawings show a cigarette 1 comprising tobacco 2 and a thin sheet 3 rolled around tobacco 2. The cigarette 1 includes a filter 4 attached to one end thereof.

This invention has a characterizing feature in the thin sheet 2 which comprises a ceramic sheet which does not produce harmful organic substances with the heat of smoking.

The ceramic sheet is 50 micrometers thick and is formed by binding with alumina sol and heat-treating a nonwoven fabric comprising a mixture of 65% by weight of ceramic fiber 2-5 micrometers in diameter obtained by melting and atomizing aluminum oxide ($Al_2O_3$) at a high temperature of 2,560° C. and 35% by weight of glass fiber 1-5 micrometers in diameter (Embodiment 1).

As an alternative, the ceramic sheet may be formed by heat-treating and thermally decomposing in a nitrogen gas atmosphere at 1,200° C., a mixture of 65% by weight of ceramic fiber 2-5 micrometers in diameter, 15% by weight of cellulose fiber, 10% by weight of glass fiber 1-5 micrometers in diameter, and 10% by weight of alumina sol binder (Embodiment 2).

The above embodiments were compared with a comparative example, i.e., the commercially available cigarette named Hi-Light.

The embodiments and the comparative example were lit and their smoke was examined. It has been found that the smoke from the embodiments was pale white and less irritating than the smoke from the comparative example.

Further, a syringe was inserted into one end of each cigarette and the smoke was sampled for analysis. It has been confirmed that the smoke from the cigarettes according to the invention contains less tar than the smoke from the comparative example. Although the reason is not clear, the embodiments are believed to burn almost as in complete combustion due to improved air permeability.

From the above description it will be understood that the present invention is applicable to any types of cigarette as long as tobacco is held by a thin sheet.

The most outstanding feature of the invention lies in that the thin sheet comprises a ceramic sheet which does not produce tar or other harmful organic substances with the heat occurring with smoking.

More particularly, where paper (rice paper) is used as the thin sheet for rolling around tobacco, the paper burns incompletely to produce harmful organic substances such as benzopyrene and benzantrasen. Having regard to this fact, the present invention employs, as the thin sheet, a ceramic sheet which burns without producing such harmful substances.

The ceramic sheet may comprise a woven or nonwoven fabric of ceramic fiber, or a mixture of paper and ceramics thermally decomposed at a high temperature.

The ceramic fiber may be selected from inorganic fibers such as silica fiber, silica-alumina fiber, alumina fiber, zirconia fiber, aluminoborosilicate, and glass fiber. The ceramic sheet is formed by binding these materials with an inorganic binder such as silica gel or alumina gel.

The inorganic fiber may be a single inorganic substance such as aluminum oxide or silicon oxide, or a combination thereof formed into a fiber 1-10 micrometers in diameter by fusing it at a high temperature of 2,000°-3,000° C. and blowing it through a nozzle, or glass fiber 0.1-10 micrometers in diameter.

Another preferred type of ceramic sheet used in this invention is formed by a mixture including 70-96% by weight, preferably 80-96% by weight, of ceramic fiber.

Specifically, Fine Flex (manufactured by Nichiasu K. K.) or Refra-Seal (manufactured by HITCO) may be used.

In this case, silicic acid gel mainly acts as a binder for bonding and binding ceramic fibers together.

This binder is highly resistant to heat and very rigid. Therefore, a relatively small amount of the binder, in combination with the shape of the stiff ceramic fiber, provides the sheet with an excellent shape retaining property.

This ceramic sheet should preferably have a void ratio of 35% or higher, and more preferably about 45-85%.

Where the void ratio is less than 35%, carbon monoxide becomes highly concentrated at the time of smoking. The void ratio exceeding 85% presents manufacturing difficulties, provides insufficient mechanical strength, and allows an excessive influx of air to impair smoking.

The ceramic sheet is not particularly limited with respect to the thickness, but preferably is about 30-300 micrometers thick for practical purposes.

The ceramic sheet is formed by making paper from a mixture of 70-96% by weight, preferably 80-96% by weight, of ceramic fiber, 2-15% by weight, preferably 2-10% by weight, of organic fiber, and 2-15% by weight, preferably 2-10% by weight, of organic binder, impregnating the paper or a shaped product thereof with colloidal silica or ethyl silicate, then transforming the silicon compound into silicic acid, and burning the paper or the shaped product thereof to thermally decompose the organic fiber and organic binder present in the paper.

The best suited organic fibers are cellulose fibers such as rayon fiber, wood pulp and other hydrophilic fibers which have good dispersion in water and are not thermoplastic. Various synthetic fibers may also be used, such as vinylon fiber, polyethylene fiber, acrylic fiber and polyester fiber. The fiber should preferably have a less than 10 denier fineness and be about 3-10 mm in fiber length, from the point of view of dispersion in water and paper strength.

The organic fiber is used for promoting dispersion of the ceramic fiber which is stiff and not coherent and increasing paper making efficiency in cooperation with the organic binder in the paper making process. The organic binder is used for promoting dispersion of the fiber and bonding the fiber to provide good paper strength prior to the heat treatment. The best suited organic binder is fibrous polyvinyl alcohol resin which allows a good paper making yield. The organic binder may also comprise acrylic resin, vinyl acetate resin, ethylene vinyl acetate resin, urea resin, melamine resin, CMC or starch in aqueous solution, emulsion, powder or fibrous form.

These paper making materials are mixed in the ratio as noted hereinbefore. The greater the amount of organic substances is, the easier become the paper making and shaping of the paper prior to the heat treatment. However, the total amount of organic substances preferably is up to 15% by weight to avoid the end product lacking in strength.

As in the well-known method, the paper making materials are made into slurry having a concentration of about 1—1% by weight. The slurry is formed by a Fortlinear or cylinder paper machine into paper having a thickness of 50-300 micrometers and a density of 2-1.4 $g/cm^3$ (after drying).

As other examples, the mixture may include highly heat resistant inorganic fibers such as silica fiber, alumina fiber, aluminosilicate fiber, and zirconia fiber, cellulose fibers such as rayon fiber and wood pulp, and various synthetic fibers such as vinylon fiber, polyethylene fiber, acrylic fiber and polyester fiber. These fibers may be bound with a cold-curing inorganic adhesive or an organic binder.

Another example of the mixture is ceramic powder carried by paper (bound with the binder as above).

A specific example of cold-curing inorganic adhesive comprises, as a main component thereof, colloidal silica ($SiO_2$) and/or water-soluble silicate of about 1–100 micrometers finely and stably dispersed or dissolved in water. Examples of colloidal silica readily available in the market include those products named Daraska (K. K. Nichiban Kenkyusho), Snowtex (Nissan Kagaku), Catalloid (Shokubai Kasei), Ludock (E. I. Dupont), Saiton (Mon Saint Chemical). These commercially available colloidal silica and/or silicate products may be used alone or in combination with an auxiliary substance such as zirconia or titanium oxide.

Various aqueous solutions of silicate, preferably silicate soda, may be readily obtained from the market for use.

Any of the inorganic adhesives having the commercially available silica and/or silicate as the main component may be used. These inorganic adhesives may further contain a coloring pigment, a curing agent, a water-soluble organic resin, a water-insoluble emulsified organic resin, various inorganic fillers and aggregates.

The mixtures used in this invention include the above organic or inorganic adhesives coated on and/or impregnated into the paper. In this case, the amount of coating and/or impregnation is important and is variable with the nature of the paper. It is generally preferred that the amount of coating and/or impregnation is about 2–100 g/m$^2$ (solid content) with respect to the paper.

Where the amount of coating and/or impregnation is less than 2 g/m$^2$, heat resistance and water resistance are insufficient. On the other hand, where the amount exceeds 100 g/m$^2$, the paper/ceramic mixture has insufficient flexibility.

In forming the mixture, the inorganic adhesive and the like may be coated on and/or impregnated into the paper by any known method such as by roll coater, spraying, brushing or immersion.

The paper or the shaped product thereof treated with the inorganic coating having silica and/or silicate as noted above may be dried at room temperature, but should preferably be dried at 100°–150° C. As a result of this drying process, the inorganic substance having silica and/or silicate as the main component as applied to the paper forms a ceramic layer.

Where the paper is coated and/or impregnated prior to shaping, the paper preferably is dried after the shaping step.

Another example of the mixture according to this invention comprises ceramic powder carried by the paper. The ceramicparticles used may include ordinary ceramic materials, metallic oxides such as alumina, silica, zircon, zirconia, and mullite, and natural or synthetic compounds such as silicon carbide, boron nitride, and silicon nitride, used alone or in combination as heat-treated and pulverized.

Preferred examples of the adhesive used in this invention for bonding the ceramic powder to the paper include inorganic adhesives such as silica sol and alumina sol, natural or synthetic resins such as glue, denatured urea resin, urethane resin, epoxy resin, cold-curing phenol resin, heat-curing phenol resin, and rubber type adhesives. However, the invention is not limited to these materials. The above adhesives may be used alone or in combination, and should be used selectively according to lining purposes.

For thermally decomposing the mixture of paper and ceramics, the mixture may be heat-treated at 500°–1,500° C., preferably 800°–1,200° C. Where the thermal decomposition temperature is less than 500° C., the thermal decomposition takes too long for practical purposes, and the compounds may be insufficiently thermally decomposed whereby harmful organic substances could be produced when the cigarette is lit. Where the thermal decomposition temperature exceeds 1,500° C., the process not only loses its meaning but results in high energy cost and requires an expensive thermal decomposition apparatus.

A further example of the mixture comprises 50–80% of ceramic fiber, 50–5% of pulp, 10–5% of glass fiber and 10% of binder. This mixture may be thermally decomposed at a high temperature as noted above, to form a ceramic sheet.

A suitable mixture may be selected for use, taking into consideration ignitionability, adhesion to tobacco and combustibility.

The preferred embodiments of the invention include a filter attached to one end of the cigarette. The filter promotes the effect of removing tar and other harmful organic substances.

What is claimed is:

1. A cigarette comprising a thin sheet for holding tobacco, wherein the thin sheet comprises a ceramic sheet of a woven or nonwoven fabric of ceramic fiber thermally decomposed at a high temperature, which produces no harmful organic substance with heat occurring with smoking of the cigarette.

2. A cigarette as claimed in claim 1 wherein the ceramic fiber comprises an inorganic fiber selected from the group consisting of silica fiber, silica alumina fiber, alumina fiber, zirconia fiber, aluminoborosilicate fiber and glass fiber.

3. A cigarette as claimed in claim 2 further comprising a filter attached to one end of the cigarette.

4. A cigarette as claimed in claim 1 wherein the thin sheet is formed by binding said ceramic fiber.

5. A cigarette as claimed in claim 1 wherein the ceramic sheet comprises a mixture of paper and ceramics thermally decomposed at a high temperature.

6. A cigarette as claimed in claim 5 wherein the mixture includes a highly heat resistant inorganic fiber selected from the group consisting of alumina fiber, aluminosilicate fiber and zirconia fiber, a cellulose fiber selected from the group consisting of rayon fiber and wood pulp, and a synthetic fiber selected from the group consisting of vinylon fiber, polyethylene fiber, acrylic fiber and polyester fiber.

7. A cigarette as claimed in claim 6 further comprising a filter attached to one end of the cigarette.

8. A cigarette as claimed in claim 5 wherein the mixture comprises paper and ceramic powder carried by the paper.

9. A cigarette as claimed in claim 8 further comprising a filter attached to one end of the cigarette.

10. A cigarette comprising a thin ceramic sheet for holding tobacco, wherein said thin sheet is formed by a mixture consisting of 65% by weight of ceramic fiber 2–5 micrometers in diameter formed by melting and atomizing aluminum oxide (Al$_2$O$_3$) and 35% by weight of glass fiber 1–5 micrometers in diameter.

11. A cigarette as claimed in claim 10 wherein said aluminum oxide (Al$_2$O$_3$) is atomized at a temperature of about 2560° C.

12. A cigarette comprising a thin ceramic sheet for holding tobacco, wherein said ceramic sheet is formed by a mixture consisting of 65% by weight of ceramic fiber 2–5 micrometers in diameter, 15% by weight of cellulose fiber, 10% by weight of glass fiber 1–5 micrometers in diameter, and 10% by weight of alumina sol binder, which is heat treated and thermally decomposed in a nitrogen gas atmosphere to form said sheet.

13. A cigarette as claimed in claim 12, in which said nitrogen gas is heated to a temperature of about 1200° C.

* * * * *